3,377,378
MANUFACTURE OF ESTERS FROM
CARBOXYLIC ACID NITRILES
John F. Jones, Cuyahoga Falls, Ohio, assignor to The
Standard Oil Company, Cleveland, Ohio, a corporation of Ohio
No Drawing. Filed May 10, 1965, Ser. No. 454,732
5 Claims. (Cl. 260—486)

The present invention relates to a novel process for the manufacture of esters of carboxylic acids by the hydrolysis of the corresponding nitrile in the presence of a strong acid, water and an olefinic hydrocarbon.

The production of carboxylic acids by the hydrolysis of the corresponding nitriles is well known. The conversion of nitriles to esters by hydrolysis and esterification with an alcohol is also known. It is also known to convert carboxylic acids to esters by reaction with certain olefinic hydrocarbons in an acid medium. Such hydrolysis is often designated as a saponification and is generally carried out in the presence of strong acids, such as sulfuric acid.

I have discovered that carboxylic acid esters can be formed readily by reacting a nitrile with water and an olefin in the presence of acid melts, for example, of sodium bisulfate, and recovering the ester. The melt containing the nitrogen derived from the nitrile group in the form of ammonium ions can be regenerated for further ester production by heating it to a temperature above the ester reaction temperature to effect ammonia desorption.

An advantage of the present process is that practically no decomposition products are produced which is contrary to the results usually obtained when sulfuric acid or other strong mineral acid is used. This is surprisingly true even when the present process is carried out at relatively high temperatures. The acid melts may be recycled several times without discoloration or drop in yield or purity of the ester products.

Nitriles which are particularly useful in the present invention include acetonitrile, propionnitrile, succinonitrile, adiponitrile, acrylonitrile, methacrylonitrile, atroponitrile, cinnamonitrile, terephthalonitrile, and the like. Particularly preferred in this invention are acrylonitrile and methacrylonitrile.

Olefins which are useful in this invention are preferably aliphatic olefinic hydrocarbons having from 2 to 6 carbon atoms such as ethylene, propylene, the butylenes, the amylenes, and the like.

The acid melts used in the present invention are melts of such substances which contain acid hydrogen atoms, and the term acid melt is used herein to signify this type of melt. Preferably, the acid salts of phosphoric or sulfuric acid, especially the alkali metal and ammonium salts of such acids, are employed for the production of such melts. In order to avoid decomposition of the nitriles, the hydrolysis products and ammonia as much as possible, it is advisable to produce the melt from components having the lowest possible melting points. The use of such low melting substances in addition facilitates the technical operation of the process and provides advantages in heat economy. Because of their low melting points, ammonium hydrogen sulfate, potassium hydrogen sulfate, sodium hydrogen sulfate and potassium hydrogen phosphate are particularly advantageous for the purposes of this invention.

In order to obtain as low a melting point as practical, further substances may be added which induce a lowered melting point of the resulting mixture in a known manner. For example, salt mixtures such as sodium and potassium hydrogen sulfates can be used. For instance, a mixture of 56.5 mol percent of sodium hydrogen sulfate and 43.5 mol percent of potassium hydrogen sulfate melts at as low a temperature as 125° C. Moreover, the addition of lithium hydrogen sulfate can lower the melting point of such a mixture down to a temperature of about 80° C.

The esterification reaction is preferably carried out at a temperature of about 300° C. or below primarily to avoid the simultaneous evolution of ammonia from the melt. Once the esterification reaction is completed, the ammonia formed from the nitrile can readily be obtained from the melt by raising the temperature of the melt above 300° C. and driving off the ammonia. In this manner the acid salt is regenerated and is ready for another charge of nitrile, water and olefin.

In place of all or a part of the olefin employed in this process one can use one or more alkyl esters of strong inorganic acids such as dialkyl sulfate, alkyl hydrogen sulfates, alkyl dihydrogen phosphates, dialkyl hydrogen phosphates, and the like including diethyl sulfate, ethyl hydrogen sulfate, the monopropyl and dipropyl sulfates and phosphates, the monobutyl and dibutyl sulfates and phosphates and the like. Most preferred are the monoalkyl hydrogen sulfates and the dialkyl sulfates wherein the alkyl group contains from 2 to 6 carbon atoms.

The present process in contrast to many of those previously known does not lead to the production of ammonium salts which are difficult to process such as ammonium hydrogen sulfate. As a consequence, the necessity of eliminating ammonium hydrogen sulfate from the waste products of the process is avoided.

The process of this invention can be carried out especially advantageously in a continuous manner in which the melt, after having been freed of the ammonia and cooled, is recycled to the hydrolysis step. For this purpose it is not necessary to drive out the ammonia from the melt completely, and it is possible to recycle a portion of the ammonium ions taken up together with the melt.

In carrying out the process of this invention, the nitriles, water, and olefin or alkyl ester of an inorganic acid can be supplied together or separately in solid, liquid or gaseous form and any heat necessary for the fusion or evaporation is supplied directly through the melt or indirectly with the air of a heat exchanger.

Nitrogen derived from the nitrile group which after completion of the esterification is present in the form of ammonium ions or in the form of a suspension of very finely divided ammonium salt crystals is recovered after the removal of the carboxylic ester formed from the melt and any remaining unconverted nitrile, by heating the melt to temperatures higher than those employed for the esterification in order that the nitrogen be driven off as gaseous ammonia. The removal of such ammonia is effected at temperatures between 300 and 450° C., and preferably between 350 and 400° C.

The recovery of the carboxylic ester produced by the instant process in the melt can be assisted by stripping with a carrier gas such as steam, air or nitrogen. Similarly, a carrier gas may be used in stripping the ammonia and excess water from the melt.

The following examples will serve to illustrate the process of this invention.

EXAMPLE I

Acrylonitrile with a stoichiometric excess of water and ethylene are contacted with molten potassium hydrogen sulfate containing small amounts of copper powder and hydroquinone monomethyl ether as polymerization inhibitors at 190° C. and the ethyl acrylate produced is recovered by stripping at a temperature below 300° C. The temperature of the molten salt is then raised to about 400° C. and the ammonia and excess water are driven off.

EXAMPLE II

The procedure of Example I was repeated with similar results when diethyl sulfate was used to replace all or a part of the ethylene.

EXAMPLE III

The procedures of Examples I and II were repeated with similar results except that methacrylonitrile was used in place of acrylonitrile.

EXAMPLE IV

When the procedures of Examples I, II and III were repeated with the exception that propylene was used in place of ethylene and propyl hydrogen sulfate was used in place of diethyl sulfate, similar results were obtained.

EXAMPLE V

The procedure of Example IV was repeated with similar results when isobutylene was used in place of propylene and tertiary butyl hydrogen sulfate was used in place of propyl hydrogen sulfate.

I claim:

1. The process for preparing a carboxylic acid ester comprising reacting a carboxylic acid nitrile selected from the group consisting of acrylonitrile and methacrylonitrile, water and at least one member selected from the group consisting of an olefin and an alkyl ester of an inorganic acid in contact with a melt of an acid salt selected from the group consisting of alkali metal salts of sulfuric and phosphoric acids at a temperature no greater than 300° C. and recovering the carboxylic acid ester by vaporization of said ester from the ammonium salt of said acid salt which is formed by reaction of said acid salt with the ammonia formed in the reaction.

2. The process of claim 1 wherein the temperature is from about 100° C. to 200° C.

3. The process of claim 2 wherein the carboxylic acid nitrile is acrylonitrile and the olefin is ethylene.

4. The process of claim 2 wherein the carboxylic acid nitrile is methacrylonitrile and the olefin is ethylene.

5. The process of claim 2 wherein the carboxylic acid nitrile is acrylonitrile and the alkyl ester of an inorganic acid is diethyl sulfate.

References Cited

UNITED STATES PATENTS

| | | | |
|---|---|---|---|
| 2,056,771 | 10/1936 | Crawford | 260—486 |
| 2,408,940 | 10/1946 | Mahan | 260—486 |
| 2,816,135 | 12/1957 | Healy | 260—486 |
| 3,325,534 | 6/1967 | Hardman et al. | 260—486 |

LORRAINE A. WEINBERGER, *Primary Examiner.*

A. P. HALLUIN, *Assistant Examiner.*